Aug. 18, 1964     R. K. JACOBS     3,145,365
ACOUSTIC WATER PATH SIMULATOR
Filed Dec. 26, 1962
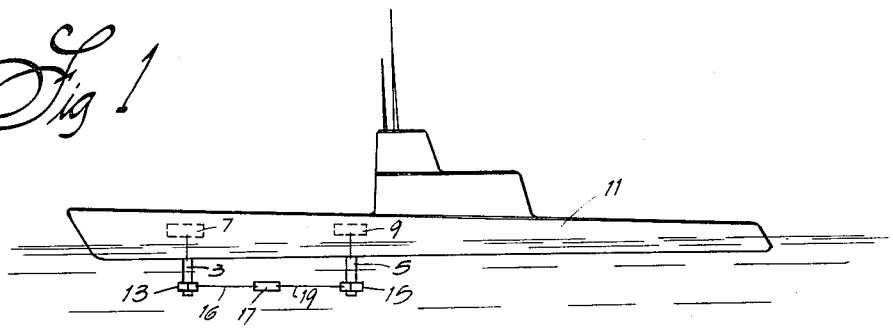
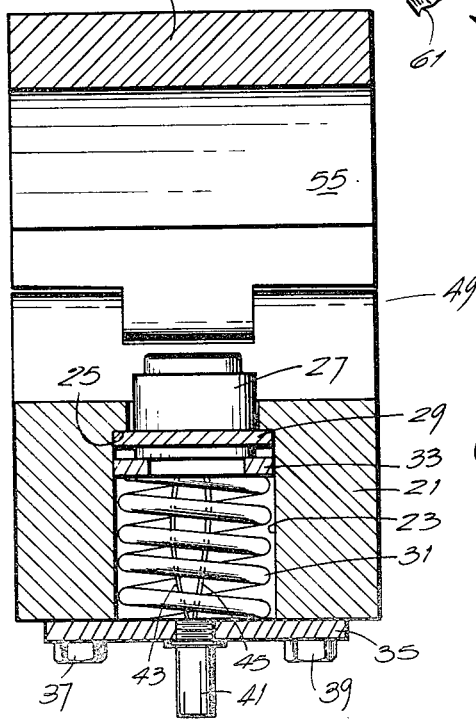
INVENTOR.
Richard K. Jacobs
BY
Arthur L. Collins
ATTORNEY

United States Patent Office 3,145,365
Patented Aug. 18, 1964

3,145,365
ACOUSTIC WATER PATH SIMULATOR
Richard K. Jacobs, Baltimore, Md., assignor, by mesne assignments, to the United States of America as represented by the Secretary of the Navy
Filed Dec. 26, 1962, Ser. No. 247,414
4 Claims. (Cl. 340—5)

The present invention relates to novel and improved electroacoustic apparatus and more particularly to novel and improved apparatus for simulating an acoustic water path for testing and checking the operation of sonar equipment.

Sonar equipment aboard a submarine or any other vessel normally requires the emersion of the pressure sensitive posts or probes in the water to complete the energy path between its transmitting and receiving circuits. It often happens, however, that when the submarine is surfaced or when the vessel is in drydock or in port for repair, the transmitting and receiving posts of the sonar equipment are above the water line. In such situations it often becomes desirable to test or check the operativeness or accuracy of the sonar equipment.

It is therefore a principal object of the present invention to provide novel and improved apparatus for testing the operability of sonar equipment.

It is a further object of the present invention to provide novel and improved apparatus for simulating an acoustic water path in the test of sonar equipment when its transmitting and receiving posts are not submerged in water.

Other objects and many of the attendant advantages of this invention will be readily appreciated as the same becomes better understood by reference to the following detailed description when considered in connection with the accompanying drawings wherein:

FIG. 1 is a diagrammatic view showing a preferred embodiment of the present invention attached to the transmitter and receiver posts of the sonar equipment of a submarine;

FIG. 2 is a diagrammatic view of one of the fixtures shown in FIG. 1 in its open position prior to its being secured to the sonar post;

FIG. 3 is a detailed cross sectional view of one of the fixtures shown in FIG. 1.

In general the improved apparatus for simulating an acoustic water path includes a transducer for each sonar post of the acoustic equipment, means for readily securing each transducer to a pressure sensitive portion of its respective transducer, an electrical attenuator, and a conductor which electrically interconnects the transducers through the attenuator. Such apparatus has been found to be particularly convenient and useful in simulating the desired effect when no actual water path is available.

A preferred embodiment of the invention is illustrated in FIGS. 1–3 of the drawing. As shown therein, the transmitting and receiving transducer posts 3 and 5 which are respectively coupled to the transmitter 7 and the receiver 9 of the sonar system extend downwardly from the outer surface of the submarine or other ship 11. Water path simulator fixtures 13 and 15 are removably secured about the outer peripheral surface of posts 3 and 5 and are electrically interconnected one to the other through the cable 16, the adjustable attenuator device 17 and cable 19. Structural details of the water path simulator fixtures 13 and 15 which are identical in design and function are best shown in FIGS. 2 and 3 of the drawing. As shown therein, each fixture includes a housing or the like 21 having a cylindrical bore 23 which extends therethrough. The upper portion of the bore 23 is preferably reduced in diameter as shown to provide an annular shoulder 25. The transducer 27, its integral retaining ring 29, the bore 23 and its shoulder 25 are dimensioned such that when the transducer 27 is positioned as shown in the bore 23, the upper surface of the retaining ring 29 engages the lower surface of the shoulder 25 and the upper extremity of the transducer 27 which houses its pressure sensitive portion extends a predetermined desired distance above the upper surface of the housing 21. The helical spring element 31 having an outside diameter slightly smaller than that of the diameter of bore 23 is positioned in the bore between the annular disk or the like 33 which engages the lower surface of the transducer 27 and the retaining plate 35 which is secured to the lower surface of the housing 21 in any suitable manner such as is shown by bolts 37 and 39. The electrical receptacle or the like 41 is preferably disposed in the retaining plate 35 as shown and provides a convenient electrical interconnection between the individual conductors 43 and 45 from the transducer 27 to the cable 16 or 19.

The upper half of each fixture 13 or 15 includes the post clamping member 47 which is hinged to one edge of the housing 21 preferably as shown by the hinge member 49 and bolts 51 and 53. The inner peripheral surface 55 of the post clamping member 47 is contoured so as to provide a concave semi-cylindrical surface that will readily engage the conventional cylindrical outer surface of post 3 or 5. The latch mechanism or the like 57 releasably secures the edges of the housing 21 and the post clamping member 47 opposite the hinge 49. The mechanism 57 preferably includes the hook-shaped dog element 59, the manually operable lever 61, and the locking and clamping arm 63. The hook-shaped dog 59 is secured in any suitable manner such as is shown by bolt 65 adjacent the lower edge of the post clamping member 47. The manually operable lever 61 is pivotably secured at one extremity adjacent the upper edge of the housing 21. The locking and clamping arm 63 which includes a suitable hasp or the like 67 at one extremity is pivotally secured at 69 to the manually operable lever 61.

In operation when the submarine or the like 11 is in drydock or otherwise disposed such that the transmitting and receiving posts 3 and 5 of the sonar equipment are not coupled one to the other by a suitable water path and it is desirable to test or check the gear, the fixtures 13 and 15 are respectively clamped on posts 3 and 5 by means of their respective latch mechanisms 57. This is done such that the transducer 27 in each fixture engages the pressure sensitive portion of its respective post and presses against it with a force of approximately fifteen pounds. Cables 16 and 19 are then attached to receptacles 41 of fixtures 13 and 15 and to the attenuator 17 so as to complete the circuit between the transmitter and the receiver of the sonar gear. When this is done, the electrical signal from the sonar transmitter 7 develops a sonic signal in the transmitter post 3 which is transferred to transducer 27 in fixture 13. In transducer 27 the signal is converted again to electrical energy which is transmitted by cables 16 and 19 through attenuator 17, where it is suitably reduced in amplitude, to the transducer 27 in fixture 15. At this point the attenuated electrical signal is again converted to sonic energy. The sonic signal is then reconverted to an electrical signal by the receiver post 5 for suitable detection and recordation in the receiver 9 of the sonar gear. In this way a suitable water path is simulated and the sonar gear may be tested even in those situations where no actual water path is convenient or available.

Obviously many modifications and variations of the present invention are possible in the light of the above teachings. It is therefore to be understood that within the scope of the appended claims the invention may be practiced otherwise than as specifically described.

What is claimed is:

1. An apparatus for simulating an acoustic water path between the transmitting and receiving posts of sonar equipment a fixture for securing a transducer to a pressure sensitive portion of either post said fixture comprising:

(a) an integral retaining ring secured to the circumference of the transducer;

(b) a housing having a bore with a reduced diameter portion which forms an internal annular shoulder, the dimensions and disposition of the transducer, its retaining ring, the bore and its shoulder being such that when the transducer is positioned in the bore and the upper surface of its retaining ring will engage the shoulder and the pressure sensitive portion of the transducer extends a predetermined distance above the upper surface of the housing;

(c) means for biasing the transducer toward its extended position above the upper surface of the housing;

(d) a concave member hinged to the upper surface of the housing, the concavity of said member being such that it substantially follows the convex curvature of the post;

(e) and means for clamping and securing the post between the concave member and the housing.

2. In apparatus for simulating an acoustic water path between the transmitting and receiving posts of sonar equipment a fixture for securing a transducer to a pressure sensitive portion of either post said fixture comprising:

(a) an integral retaining ring secured to the circumference of the transducer;

(b) a housing having a bore with a reduced diameter portion which forms an internal annular shoulder, the dimensions and disposition of the transducer, its retaining ring, the bore and its shoulder being such that when the transducer is positioned in the bore and the upper surface of its retaining ring will engage the shoulder and the pressure sensitive portion of the transducer extends a predetermined distance above the upper surface of the housing;

(c) a retaining plate secured to the bottom of the housing across the bore opening therein;

(d) a helical spring in compression between the lower surface of the transducer and the retaining plate;

(e) a concave member hinged to the upper surface of the housing, the concavity of said member being such that it substantially follows the convex curvature of the post;

(f) and means for clamping and securing the post between the concave member and the housing.

3. In apparatus for simulating an acoustic water path between the transmitting and receiving posts of sonar equipment a fixture for securing a transducer to a pressure sensitive portion of either post said fixture comprising:

(a) an integral retaining ring secured to the circumference of the transducer;

(b) a housing having a bore with a reduced diameter portion which forms an internal annular shoulder, the dimensions and disposition of the transducer, its retaining ring, the bore and its shoulder being such that when the transducer is positioned in the bore and the upper surface of its retaining ring will engage the shoulder and the pressure sensitive portion of the transducer extends a predetermined distance above the upper surface of the housing;

(c) an annular disk disposed in the bore beneath the lower surface of the transducer;

(d) a retaining plate secured to the bottom of the housing across the bore opening therein;

(e) a helical spring in compression between the lower surface of the annular disk and the retaining plate;

(f) a concave member hinged to the upper surface of the housing, the concavity of said member being such that it substantially follows the convex curvature of the post;

(g) and means for clamping and securing the post between the concave member and the housing.

4. Apparatus for simulating an acoustic water path between the transmitting and receiving posts of sonar equipment, said apparatus comprising:

(a) a pair of transducers;

(b) a device for attenuating an electrical signal;

(c) means for electrically connecting the attenuating device between the said pair of transducers;

(d) means for securing one of the transducers to a pressure sensitive portion of the transmitting post;

(e) and means for securing the other transducer to a pressure sensitive portion of the receiving post, each said means for securing a transducer to a pressure sensitive portion of a sonar post including:

(1) an integral retaining ring secured to the circumference of the transducer;

(2) a housing having a bore with a reduced diameter portion which forms an internal annular shoulder, the dimensions and disposition of the transducer, its retaining ring, the bore and its shoulder being such that when the transducer is positioned in the bore and the upper surface of its retaining ring will engage the shoulder and the pressure sensitive portion of the transducer extends a predetermined distance above the upper surface of the housing;

(3) means for biasing the transducer toward its extended position above the upper surface of the housing;

(4) a concave member hinged to the upper surface of the housing, the concavity of said member being such that it substantially follows the convex curvature of the post;

(5) and means for clamping and securing the post between the concave member and the housing.

References Cited in the file of this patent

UNITED STATES PATENTS

| | | |
|---|---|---|
| 2,918,651 | Podolak et al. | Dec. 22, 1959 |
| 2,944,621 | Loofbourrow | July 12, 1960 |